United States Patent
Blackwelder

(10) Patent No.: US 6,767,115 B2
(45) Date of Patent: Jul. 27, 2004

(54) PNEUMATIC TELESCOPING MAST

(75) Inventor: Paul B. Blackwelder, Wadsworth, OH (US)

(73) Assignee: The Will-Burt Company, Orrville, OH (US)

( * ) Notice: Subject to any disclaimer, the term of this patent is extended or adjusted under 35 U.S.C. 154(b) by 99 days.

(21) Appl. No.: 10/264,105

(22) Filed: Oct. 3, 2002

(65) Prior Publication Data

US 2003/0095411 A1 May 22, 2003

Related U.S. Application Data

(60) Provisional application No. 60/332,607, filed on Nov. 16, 2001.

(51) Int. Cl.[7] .................................................. B60Q 1/06
(52) U.S. Cl. ........................ 362/385; 362/526; 362/418; 52/118
(58) Field of Search ................................ 362/385, 523, 362/526, 285, 418, 419; 52/118

(56) References Cited

U.S. PATENT DOCUMENTS

| | | | | |
|---|---|---|---|---|
| 4,488,209 A | * | 12/1984 | Gosswiller | 362/486 |
| 4,594,824 A | * | 6/1986 | Ziegler et al. | 52/118 |
| 5,572,837 A | * | 11/1996 | Featherstone et al. | 52/118 |
| 5,743,635 A | * | 4/1998 | Hulse et al. | 362/385 |
| 5,980,070 A | * | 11/1999 | Hulse et al. | 362/385 |
| 6,299,336 B1 | * | 10/2001 | Hulse | 362/526 |

* cited by examiner

Primary Examiner—Thomas M. Sember
(74) Attorney, Agent, or Firm—Fay, Sharpe, Fagan, Minnich & McKee

(57) ABSTRACT

A pneumatically actuated telescoping mast assembly has a mast axis and comprises a plurality of telescopically interengaged mast tubes having axially opposite ends and being axially slidable relative to one another along the mast axis between retracted and extended positions. Axially adjacent mast tubes include a stop collar held on one of the ends of each tube by a snap ring. The radially inner mast tube, of two adjacent mast tubes, includes a double wrap snap ring thereon for engaging the stop collar on the radially outer mast tube to limit relative axial displacement therebetween. The radially inner mast tube further includes a guide collar with a gasket slidably engaging the inner side of the radially outer mast tube. The mast assembly also includes an internal support collar for displacing and supporting the internal wiring used to supply power to the top of the mast assembly.

19 Claims, 7 Drawing Sheets

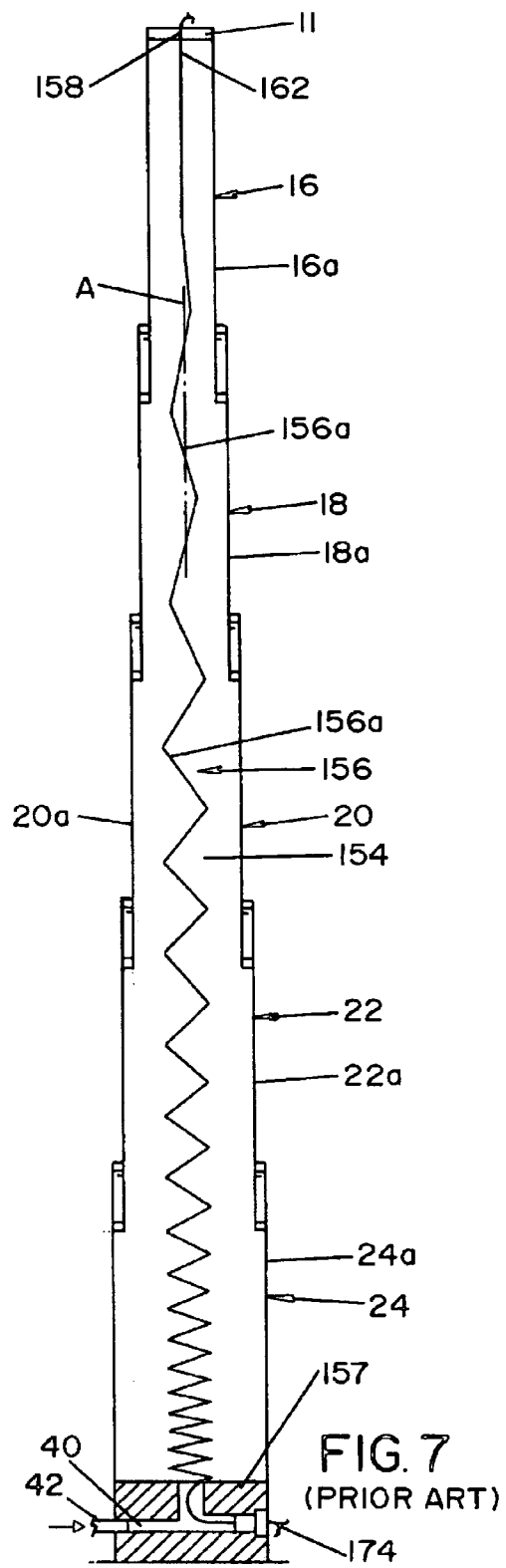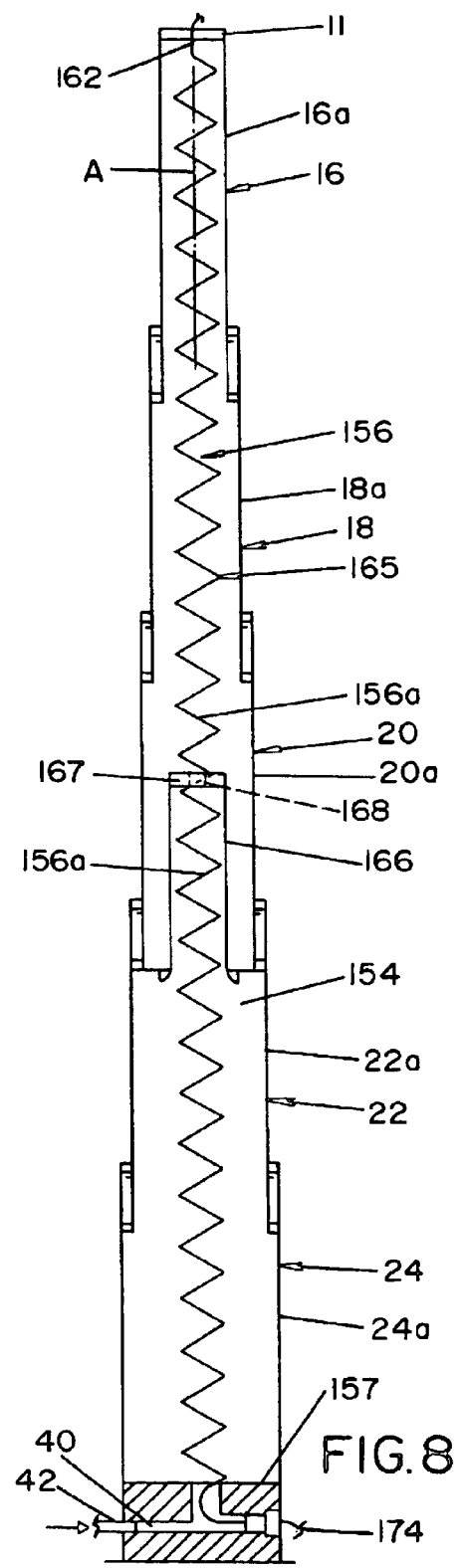
FIG. 7 (PRIOR ART)
FIG. 8

PNEUMATIC TELESCOPING MAST

This patent application claims priority on Provisional Patent Application No. 60/332,607, filed Nov. 16, 2001.

The present invention relates to the art of pneumatically actuated telescoping masts for supporting a light or the like, and more particularly, to improvements in the connections between adjacent telescoping sections and the displacement of an internally coiled conductor for supplying power to the light.

INCORPORATION BY REFERENCE

Featherstone, U.S. Pat. No. 4,413,451; Hulse U.S. Pat. No. 6,290,377; and Hulse, et al. U.S. Pat. No. 5,743,635 are incorporated by reference for background information relating to pneumatically actuated telescoping masts of the character to which the invention is directed.

BACKGROUND OF THE INVENTION

Pneumatically actuated telescoping masts are well known in the art, and are, for example, mounted on the roof of a motor vehicle such as an emergency vehicle or utility vehicle. Alternatively, mounting configurations may also involve the floor of a vehicle, allowing the telescoping mast to extend through the roof of the vehicle. The mast is generally used for positioning electrical devices, such as lighting fixtures, at an elevated point above the vehicle. The effect of a lighting fixture is to light a large area around the vehicle, allowing emergency procedures to be conducted under the light, such as at accident scenes or by utility work crews during power outages, for example. Pneumatically actuated telescoping masts are particularly advantageous for such uses, because they are lightweight, compact in the retracted position, and quickly transportable to a site by the vehicles on which they are mounted. Pneumatically actuated telescoping masts are extended and retracted using air under pressure and, in a fully extended use position, are usually vertical, although they can be inclined in the use position. The vehicle on which the telescoping mast is mounted typically includes a compressor and appropriate pneumatic controls for displacing the mast sections between retracted and extended positions. The connections between adjacent telescoping sections of pneumatically actuated masts heretofore available have been difficult and time consuming to assemble. In part in this respect, certain parts of the connections are either welded or secured with numerous threaded fasteners, whereby the resulting mast is undesirably expensive to manufacture.

Pneumatically actuated telescoping masts include power and signal cables which extend to the payload on top of the mast. A common option in this respect is to coil the cables exteriorly about and along the mast. This approach has the virtue of accessibility and flexibility but the liabilities of exposure to physical damage and to the elements. Another option is routing a coiled cable interiorly of the mast. A problem encountered with internally routed power cables is that the coiled wire forms a weak spring. With any extended length of a coil greater than about 15 feet, the coil convolutions tend to collapse in the bottom of the mast due to the accumulated weight of the convolutions. This can result in tangling and/or snagging of the convolutions with one another when the extension moves beyond 15 feet. Also, with longer, heavier wire coils, the upper end of the cable which must support the weight of the coil therebelow is stressed by the accumulated weight of the convolutions. This can lead to breakage of the cable and requires a special connection at the cable end to preclude or minimize the likelihood of such breakage.

SUMMARY OF THE INVENTION

In accordance with the present invention, a pneumatically telescoping mast is provided which minimizes or overcomes the disadvantages of prior art pneumatically telescoping masts. In this respect, a telescoping mast according to the invention is comprised of component parts by which assembly of the mast is simplified, the weight of the mast is reduced and manufacturing of the mast is more economical than heretofore possible. These attributes are achieved through the provision of improved parts and structures between adjacent mast sections. The connecting components between adjacent mast sections include parts constructed of plastic, thereby minimizing weight of the mast assembly. Additionally, the attachment of collars to the tube of each mast section is simplified so as to avoid the use of numerous threaded fasteners, thereby simplifying assembly. Each of the mast sections includes an improved arrangement for halting movement of the sections when the mast assembly is fully extended.

In accordance with another aspect of the invention, a support arrangement is provided for an internal coiled power cable which advantageously reduces the stress on the terminal upper end of the cable and reduces the tendency of a long coil to collapse and the convolutions thereof to tangle, and/or snag during extension and retraction of the mast.

It is accordingly an outstanding object of the present invention to provide a pneumatically actuated telescoping mast with an improved connecting structure between adjacent mast sections.

A further object of the invention is to provide a mast of the foregoing character with an improved connecting structure that simplifies assembly of the mast.

Still a further object of the invention is to provide a mast of the foregoing character with an improved structure for halting movement of the mast sections when the mast assembly is filly extended.

Yet another object of the present invention is to provide a mast of the foregoing character with an internal support arrangement for a coiled, internal power cable which reduces the stress on the terminal end of the cable at the top of the mast and supports the coiled cable in a manner which reduces the tendency of the cable to collapse, tangle, and/or snag during extension and retraction of the mast.

Another object of the invention is to provide a telescoping mast that is more economical to manufacture than similar masts heretofore available.

These and other objects of the present invention will be obvious or pointed out more filly in the following detailed description of preferred embodiments.

BRIEF DESCRIPTION OF THE DRAWINGS

The invention may take physical form in certain parts and arrangements of parts, embodiments of which will be described and illustrated in the accompanying drawings which form a part hereof and wherein:

FIG. 7 is an elevation view schematically illustrating a pneumatically actuated telescoping mast and internal power cable according to the prior art;

FIG. 8 is an elevation view schematically illustrating a support arrangement in a pneumatically actuated telescoping mast for an internal power cable according to the present invention; and, FIG. 9 is an enlarged sectional elevation view, showing the mast fully collapsed, of the support arrangement shown in FIG. 8.

DESCRIPTION OF PREFERRED EMBODIMENTS

Figure 1:
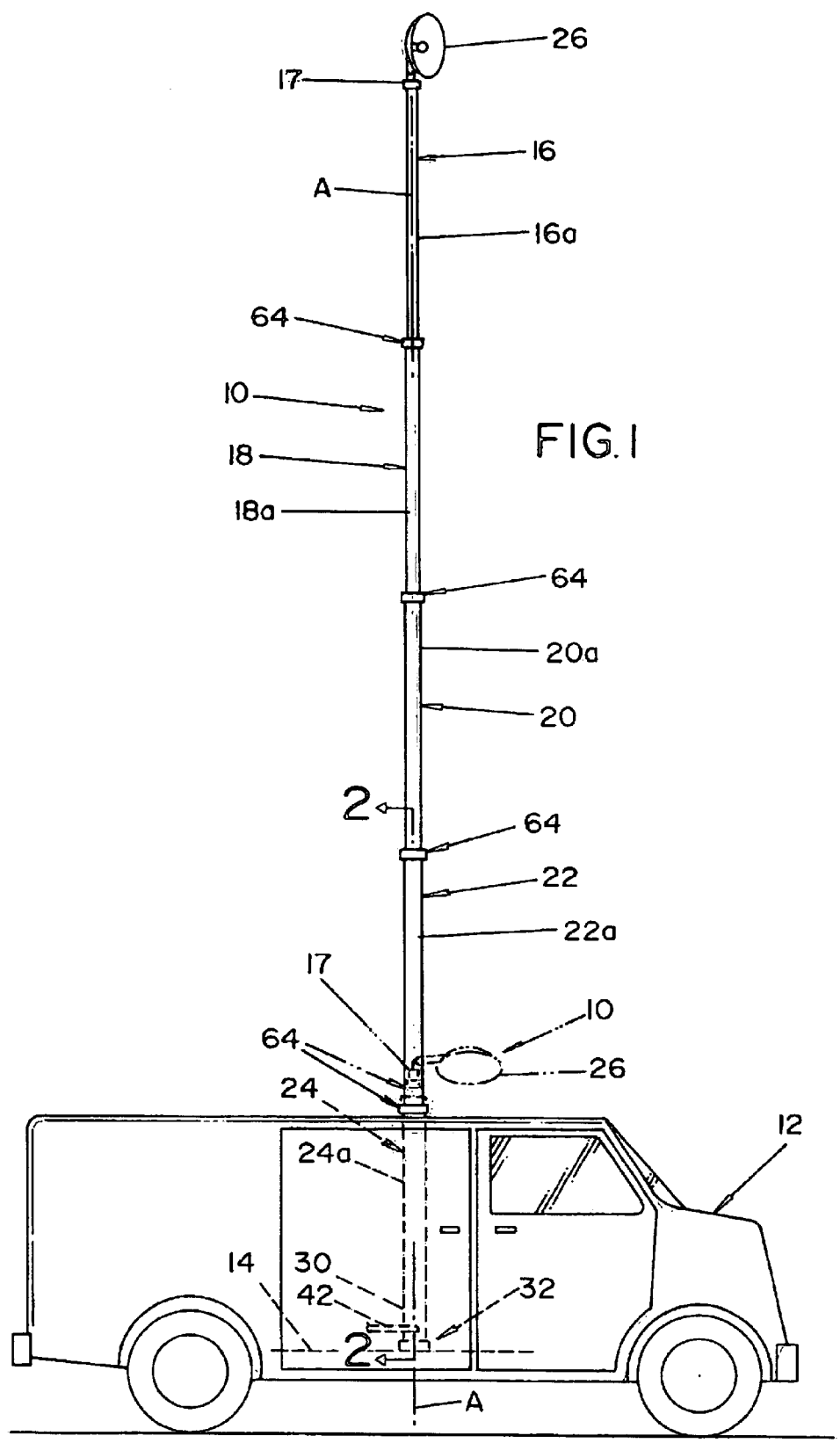
FIG. 1 is a side elevation view of a vehicle having a telescoping mast, shown fully extended according to the present invention mounted thereon.
Figure 2:
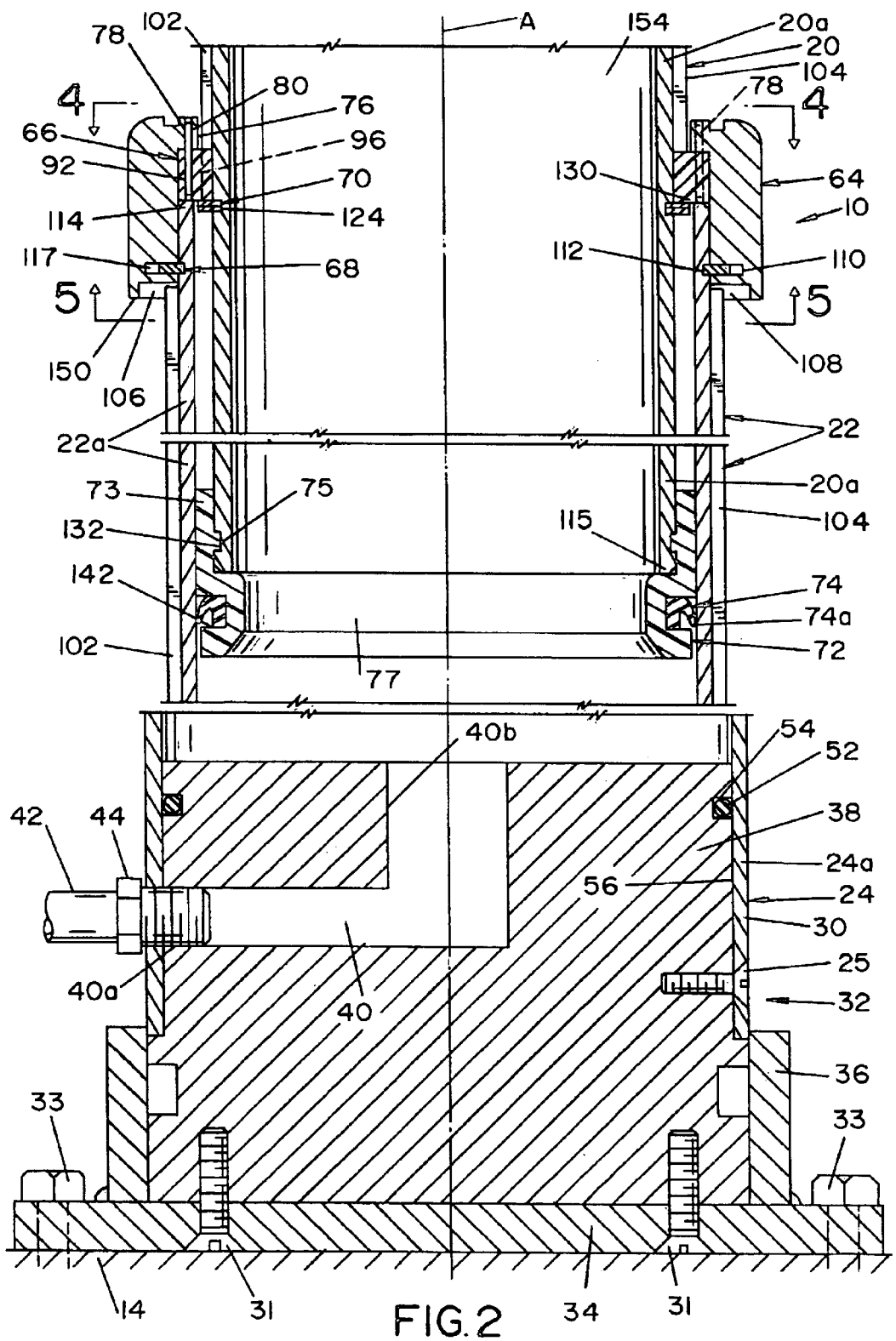
FIG. 2 is an enlarged sectional elevation view of a portion of the mast taken along line 2—2 in FIG. 1.

Referring to the drawings, wherein the showings are for the purpose of illustrating preferred embodiments of the invention only and are not for the purpose of limiting same, FIG. 1 shows a pneumatically actuated telescoping mast assembly 10 according to the present invention having a base end mounted within a vehicle 12. More particularly in this respect, mast assembly 10 includes five telescoping mast sections 16, 18, 20, 22, and 24, of which mast section 24 is a base section mounted on floor 14 of vehicle 12. Base section 24 has a lower end 30 mounted on floor 14 by a base support 32 which, as shown in FIG. 2, includes a base plate 34, a collar 36 welded thereto, and a mounting block 38 in collar 36 and tube end 30. Block 38 is secured on the lower end of section 24 by one or more bolts 25, plate 34 is attached to the underside of block 38 by bolts 31, and plate 34 is mounted on floor 14 by bolts 33. The other four mast sections 22, 20, 18, and 16 extend sequentially along mast axis A from base section 24, and satellite dish 26 is shown atop the uppermost mast section 16 together with a wiring box assembly 17 on which the light is mounted and which encloses the electrical wiring for satellite dish 26. In FIG. 1, mast assembly 10 is shown by solid lines in its fully extended position and, immediately above the vehicle roof, is shown by phantom lines in its fully retracted position.

As further shown in FIG. 2, mounting block 38 and tube end 30 are provided with an air supply passageway 40 having an end 40a for connection to a source of air and an end 40b communicating with the interior of the mast. End 40a is adapted to be connected to a source of air such as a compressor, not shown, by an air line 42 connected to end 40a by a fitting 44. Air entering passageway 40 for extending the mast sections is precluded from leaking between section 24 and mounting block 38 by an o-ring seal 52 in a radially outwardly open annular recess 54 in block 38 and which seal engages interior side 56 of mast section 24. The air supply to the interior of mast 10 from the compressor is through well known controls, not shown, which include an up/down solenoid valve, as shown, for example, in the aforementioned U.S. Pat. No. 5,743,635 to Hulse, et al. The solenoid valve controls the extension and retraction of mast assembly 10 and the air pressure to the mast is controlled by a metering valve on the solenoid valve.

Figure 3:
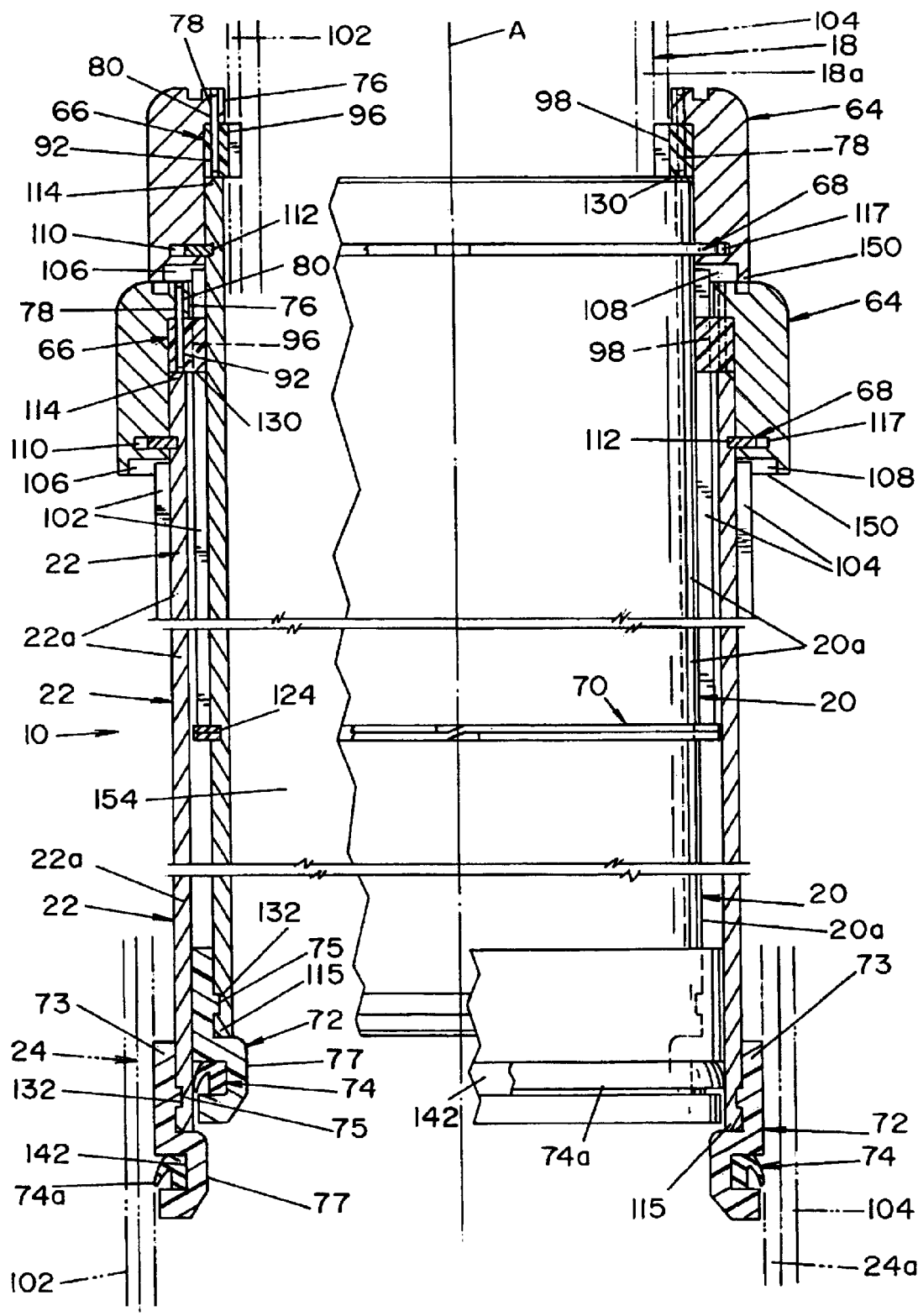
FIG. 3 is a sectional elevation view similar to FIG. 2 and showing sections of the mast in a collapsed position.
Figure 4:
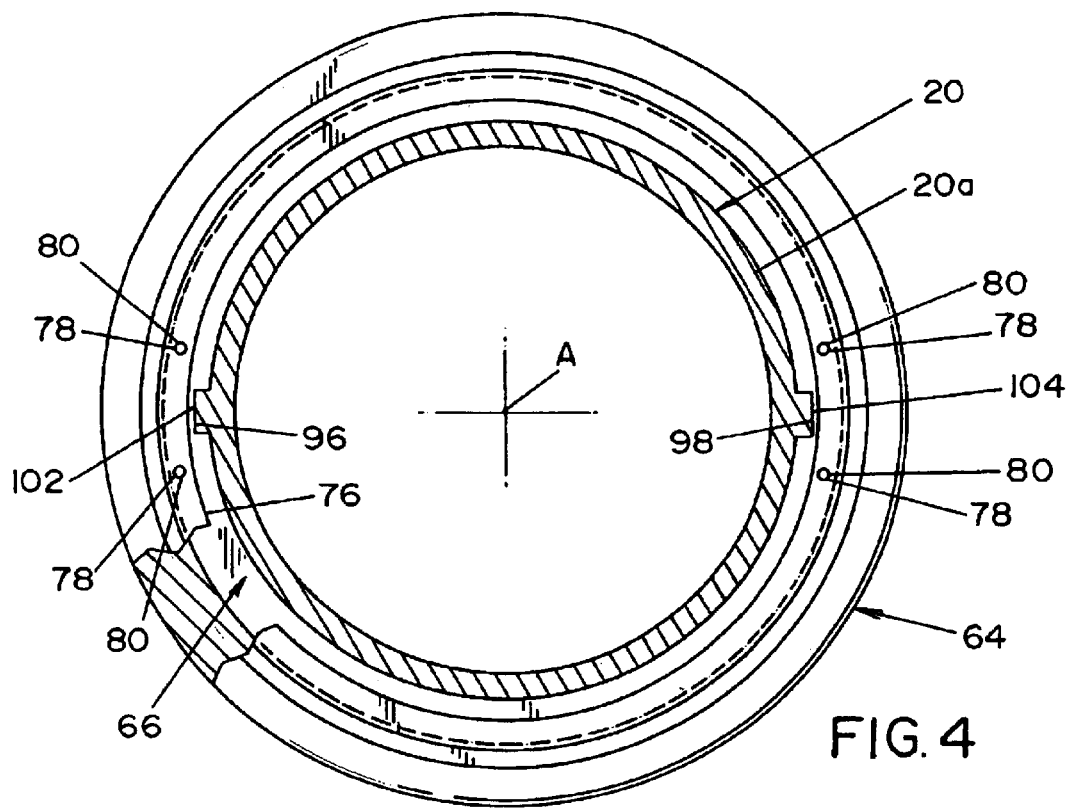
FIG. 4 is a cross-sectional top plan view of the connection between two adjacent mast sections taken along line 4—4 in FIG. 2.
Figure 5:
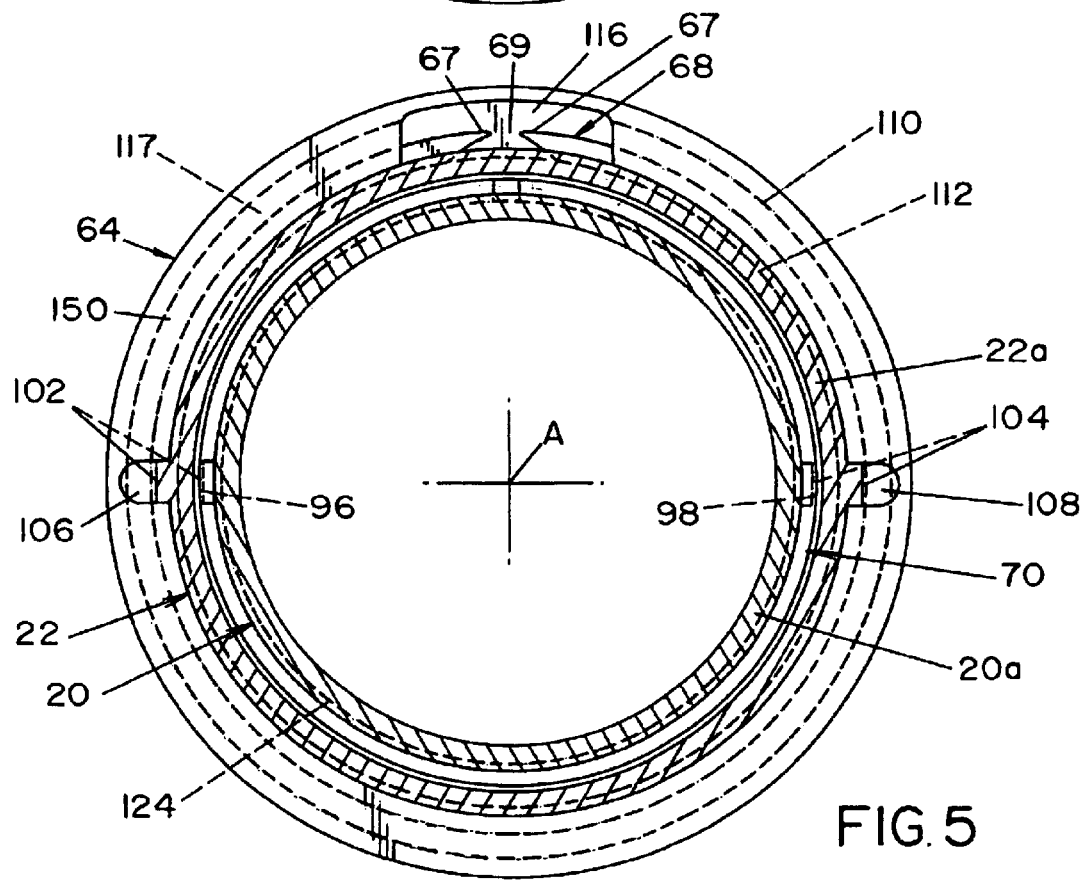
FIG. 5 is a cross-sectional bottom plan view of the same connection between two adjacent mast sections taken along line 5—5 in FIG. 2.
Figure 6:
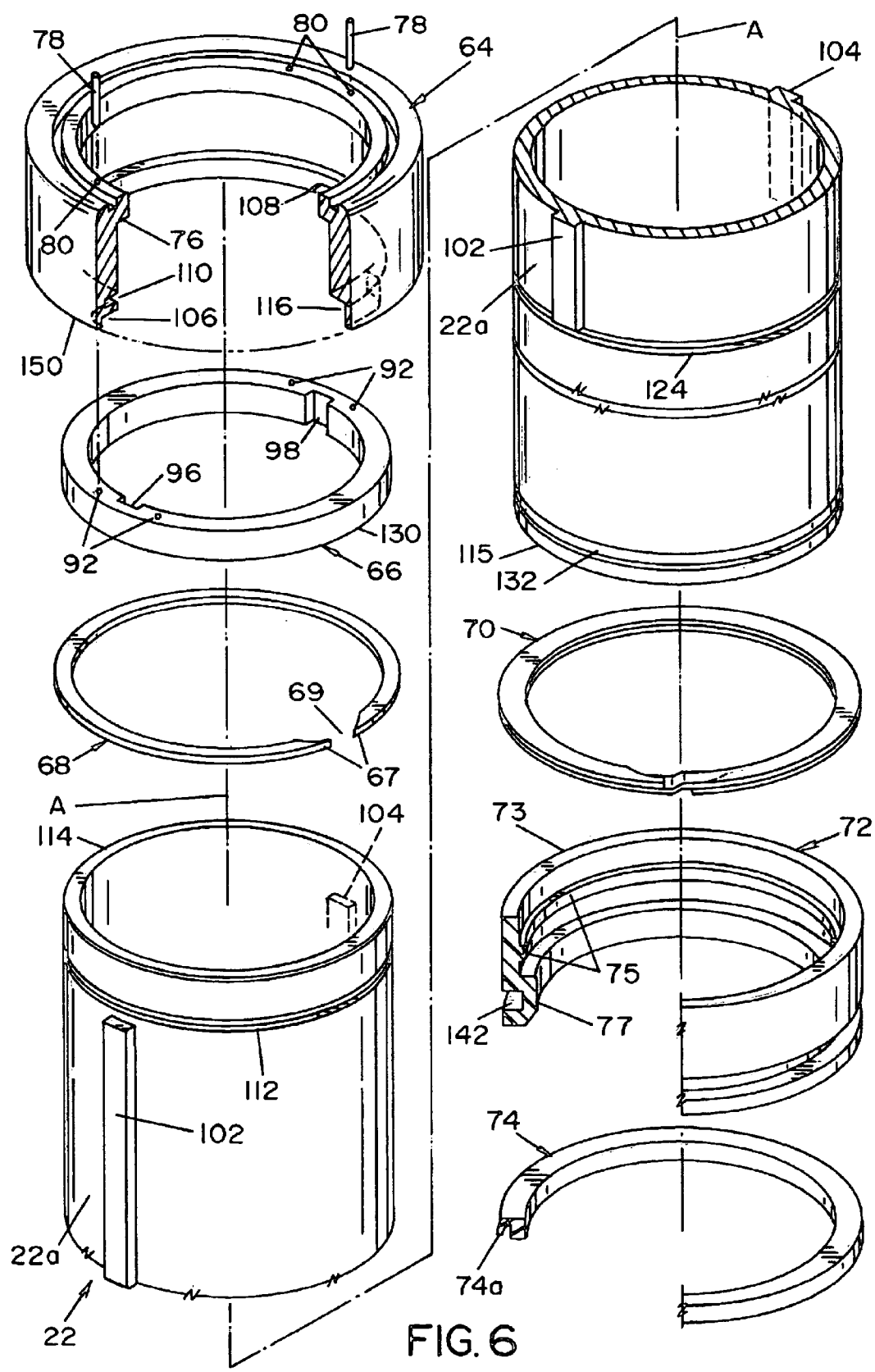
FIG. 6 is an exploded view of the connection components of adjacent mast sections.

Each of the mast sections 16, 18, 20, 22, 24 includes a corresponding mast tube designated, sequentially, 16a, 18a, 20a, 22a, 24a, and each of the tubes has an upper end and a lower end with respect to the vertical orientation of the mast assembly in FIG. 1. As will be more fully described hereinafter, axially adjacent ones of the mast sections include interengaging guide and stop components on the mast tubes and which are structurally and functionally identical and vary only in diametrical dimensions which are dictated by the diameter of the corresponding mast tube. FIGS. 2 and 3 show adjacent mast sections 20 and 22, and it will be appreciated that the following description with respect to the guide and stop components on the tubes 20a and 22a thereof are applicable to the other mast sections of mast assembly 10. FIGS. 4–6 further show relationships between certain of the components interconnecting adjacent mast tubes. The connecting components basically comprise a stop collar 64, stop collar insert 66 and snap ring 68 at the upper end of each tube, a double wrap snap ring 70 intermediate the upper and lower ends of each tube as shown with respect to tube 20a in FIGS. 2, 3 and 6, and a guide collar 72 and sealing gasket 74 at the lower end of each tube. More specifically, stop collar 64 surrounds the upper end of each tube and receives a corresponding stop collar insert 66 under an inner circumferential lip 76 of the stop collar. Insert 66 is secured to collar 64 by four connecting pins 78 to prevent rotation of insert 66 relative to collar 64. Pins 78 extend through holes 80 through lip 76 of collar 64 and holes 92 through stop collar insert 66. Stop collar insert 66 includes diametrically opposing notches or keyways 96 and 98 on the inner side thereof for respectively receiving longitudinal protrusions or keys 102 and 104 which extend along diametrically opposite sides of tubes 20a and 22a to prevent rotation of the stop rings and inserts relative to the mast tubes.

Collar 64 includes diametrically opposing key pockets 106 and 108 on the lower inner side thereof for respectively receiving the upper end of longitudinal keys 102 and 104 preventing rotation of collar 64. The keys 102, 104, keyways 96, 98, and key pockets 106, 108 lock mast to fixed mast section 24 preventing rotation thereof.

Collars 64 and inserts 66 are mounted on upper ends 114 of tubes 18a, 20a, 22a, and 24a by a corresponding snap ring 68 which is received in an inwardly open circumferential groove 110 on the inner side of collar 64 and an outwardly open circumferential groove 112 in the corresponding mast tube axially inwardly of top end 114 thereof. Snap ring 68 has opposite ends 67 providing an open sector 69 in its free state to allow for radially constricting the ring, and circumferential groove 110 includes an axially downwardly open space 116 which allows for access to ends 67 for spreading snap ring 68 relative to its free state. In assembly, snap ring 68 is first slightly compressed circumferentially by urging the ends 67 toward each other allowing the snap ring to be received within stop collar 64 to a point of engagement with circumferential groove 110. At such time, ring 68 expands and snaps into groove 110 and remains therein. The radial depth (largest diameter) of groove 110 is greater than the outer diameter of ring 68 in the free state thereof, thus providing a space 117 for expanding the ring from its free state. By accessing ring ends 67 through opening 116, ring 68 can be circumferentially expanded so that the upper end of the corresponding mast tube is able to pass through the ring, and stop collar 64 is then moved axially onto the tube. When grooves 110 and 112 are aligned, the memory of ring 68 causes it to contract into groove 112 thereby axially retaining stop collar 64 and insert 66 on the tube end.

Tubes 16a, 18a, 20a and 22a of mast sections 16, 18, 20 and 22 include a double wrap snap ring 70 which, as will be appreciated from tube 20a in FIG. 3, is received in an outer circumferential groove 124 extending circumferentially around the mast tube at a location close to the lower end thereof. In assembly, snap ring 70 is circumferentially expanded and then slid axially over the outer side of the mast tube until received in groove 124. During mast extension, snap ring 70 stops vertical movement between adjacent mast tubes when the snap ring abuts bottom side 130 of the stop collar insert 66 on the adjacent mast tube. During retraction of the mast sections, relative displacement stops when the lower end 150 of the stop collar engages the upper end of the stop collar on the outwardly adjacent tube. Collar 64 may be provided with bumpers or seals engaging lower end 150 thereof.

Each mast tube further includes a guide collar 72 on lower end 115 thereof which includes a cylindrical skirt 73 having a radially inwardly extending circumferential rib 75 received in an outwardly open circumferential groove 132 proximal to bottom end 115 of the tube. Guide collar 72 further includes a radially inwardly extending circumferential channel portion 77 underlying end 115 and providing a radially outwardly open circumferential recess 142 which receives a gasket 74 having a flexible lip 74a for sealing engagement with the inner side of the outwardly adjacent mast tube. Gasket 74 ensures an airtight seal between the adjacent mast tubes.

In the preferred embodiment of the invention, stop collar 64 is of aluminum and insert 66 is of a suitable plastic such as DELRIN. Guide collar 72 is of aluminum with a suitable plastic inner lining such as DELRIN, and gasket 74 is of a suitable resilient sealing material. Snap ring 68 and double wrap snap ring 70 are of a spring-type material such that the rings are flexible, expandable and corrosion resistant, and return to the normal or unstressed position thereof after having been deformed and released.

Figure 9:
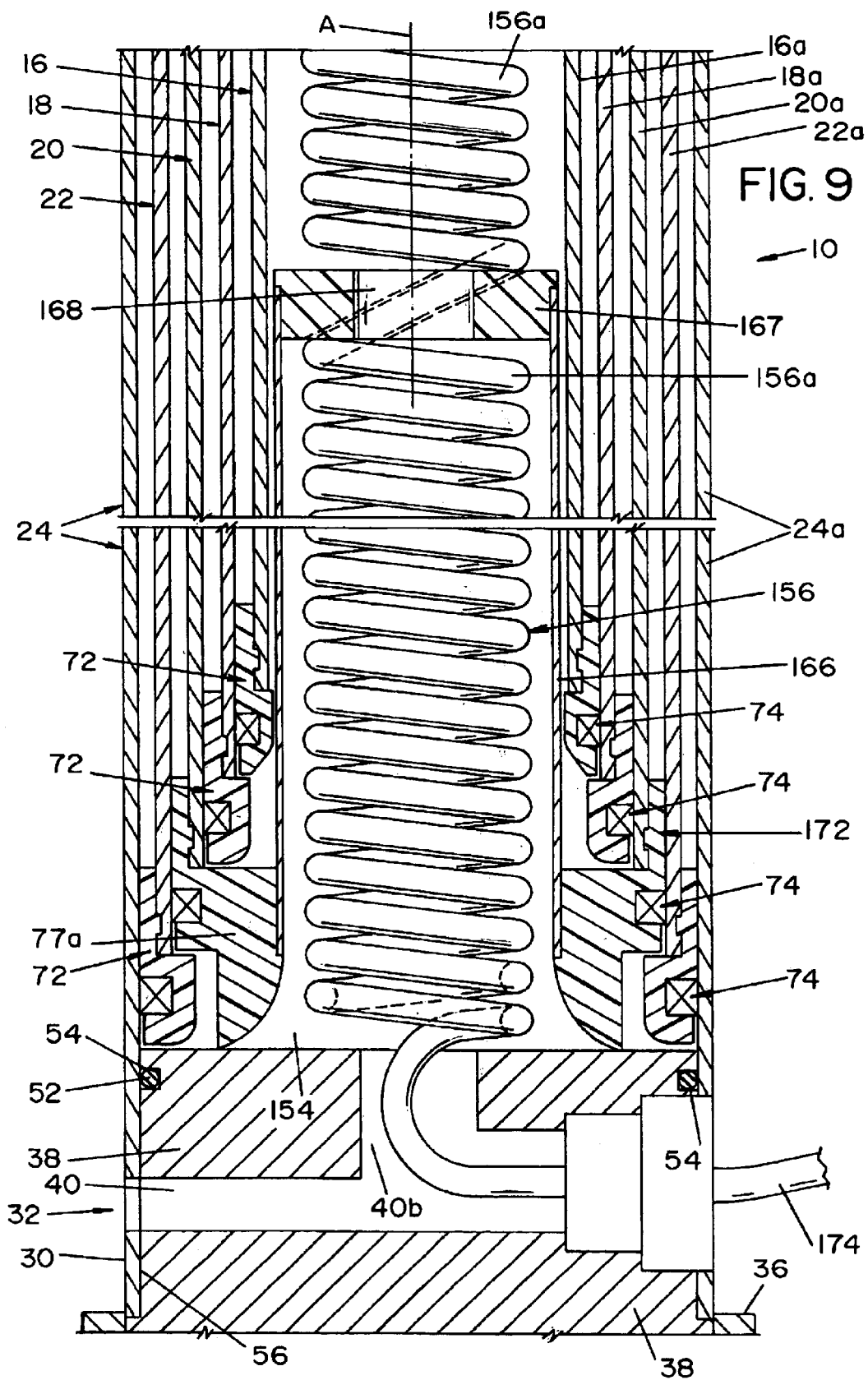

Satellite dish 26 at the upper end of the mast assembly requires a power source 174, and FIGS. 8 and 9 show an arrangement for supplying power to upper end 11 of the mast assembly in accordance with the present invention. FIG. 7 shows a prior art arrangement for supplying power through a wire coil 156 within the interior 154 of a mast as described herein having sections 16, 18, 20, 22, 24. The prior art coil has convolutions 156a starting at a bottom end 157 and extending upward to the top end 158 of the mast. Initially, the convolutions of coil 156 are helical, and the coil is capable of extending and retracting within the mast assembly. As shown in FIG. 7, however, when the mast is fully extended, the weight of the coil convolutions tends to concentrate the latter at the bottom of the mast assembly and the coils at the upper end of the mast tend to straighten out. Concentration of the coils at the bottom can cause tangling, snagging, and interference of the convolutions with one another when the mast assembly is extended and retracted. Additionally, when the mast is fully extended, the stress on upper termination 162 of the coil resulting from the weight of the coil can cause the cable to break at the upper end thereof.

FIGS. 8 and 9 show a feature of the invention by which the disadvantages of the arrangement shown in FIG. 7 are overcome. More particularly in this respect, a sleeve or tube 166 is connected to the lower end of the tube of one of the intermediate mast sections, such as tube 20a of mast section 20, and extends axially upwardly thereinto to a point about midway between the tube ends. A support collar 167 is attached to the upper end of sleeve 166, and coil 156 extends through the sleeve and mast tubes 16a, 18a, 20a, 22a, 24a and is interengaged with the coil collar 167 about midway between the opposite ends thereof. More particularly in this respect, support collar 167 is interposed between adjacent coil convolutions 156a at the midpoint of the coil whereby, when the mast sections are extended as shown in FIG. 8, support collar 167 lifts the coil convolutions therebeneath and supports the lower one of the convolutions of the portion of the coil thereabove. Accordingly, the coil convolutions are generally uniformly spaced apart between the bottom and top ends of the extended mast, as shown in FIG. 8. As will be appreciated, support collar 167 includes an opening 168 therethrough which allows air to pass across the support collar, thereby facilitating mast extension by the pneumatic drive system. As will be appreciated from FIG. 9, the guide collar 172 on the lower end of mast tube 20a is modified to accommodate the mounting of tube 166 and support collar 167 thereon. In this respect, channel portion 77a thereof is extended radially inwardly to underlie the lower ends of tubes 16a and 18a and extends downwardly to position tube 20a relative to mounting block 38 when the mast sections are fully retracted, whereby the mounting block supports the upper and lower coil sections in the collapsed positions thereof. It will be appreciated that one or more additional tubes and collars similar to tube 166 and support collar 167 can be attached to others of the mast tubes or to the tubes of additional mast sections for further supporting coil 156 as the mast sections are extended and retracted.

While considerable emphasis has been placed herein on the preferred embodiments of the invention, it will be appreciated that other embodiments can be made and that many changes can be made in the preferred embodiments without departing from the principles of the invention. Accordingly, it is to be distinctly understood that the foregoing descriptive matter is to be interpreted merely as illustrative of the invention and not as a limitation.

Having thus described the invention, it is claimed:

1. In a pneumatically actuated telescoping mast assembly having a mast axis and comprising a plurality of telescopically interengaged mast tubes having axially opposite ends and being axially slidable relative to one another along the mast axis between retracted and extended positions, means for displacing said mast tubes between said retracted and extended positions, and a wire coil for providing electrical power to a fixture on an end of said mast assembly, the improvement comprising:

at least two axially adjacent ones of said telescoping mast tubes including a stop collar held on one of said ends of each tube by a snap ring.

2. The telescoping mast assembly of claim 1, wherein the radially inner one of the at least two tubes has a double wrap snap ring thereon between the one and the other of the opposite ends thereof for engaging the stop collar on the radially outer one of the at least two tubes to limit relative axial displacement therebetween.

3. The telescoping mast assembly of claim 2, and a guide collar on the other of said opposite ends of the radially inner tube and slidably engaging the inner side of said radially outer tube.

4. The telescoping mast assembly of claim 3, wherein each said guide collar includes a gasket on the radially outer side, said gasket slidably engaging the inner side of said radially outer tube.

5. The telescoping mast assembly of claim 3, wherein said wire coil has opposite ends and at least one of said telescoping mast sections includes means for supporting said wire coil between said opposite ends thereof for displacement with the one mast section.

6. In a pneumatically actuated telescoping mast assembly having a mast axis and comprising a plurality of telescopically interengaged mast tubes having axially opposite ends and being axially slidable relative to one another along the mast axis between retracted and extended positions, means for displacing said mast tubes between said retracted and extended positions, and a wire coil for providing electrical power to a fixture on an end of said mast assembly, the improvement comprising:

the radially outer one of at least two axially adjacent ones of said mast tubes including a stop collar, and a double wrap snap ring on the radially inner one of the axially adjacent tubes for engaging the stop collar to limit axial displacement therebetween.

7. The telescoping mast assembly of claim 6, and a guide collar on said radially inner one of said tubes slidably engaging the inner side of said radially outer tube.

8. The telescoping mast assembly of claim 7, wherein each said guide collar includes a gasket on the radially outer side, said gasket slidably engaging the inner side of said radially outer tube.

9. The telescoping mast assembly of claim 7, wherein said wire coil has opposite ends and at least one of said telescoping mast sections includes means for supporting said wire coil between said opposite ends thereof for displacement with the one mast section.

10. The telescoping mast assembly of claim 6, wherein said wire coil has opposite ends and at least one of said telescoping mast sections includes means for supporting said wire coil between said opposite ends thereof for displacement with the one mast section.

11. In a pneumatically actuated telescoping mast assembly having a mast axis and comprising a plurality of telescopically interengaged mast tubes having axially opposite ends and being axially slidable relative to one another along the mast axis between retracted and extended positions, means for displacing said mast tubes between said retracted and extended positions, and a wire coil for providing electrical power to a fixture on an end of said mast assembly, the improvement comprising:

a guide collar on one of said opposite ends of the radially inner one of said tubes slidably engaging the inner side of said radially outer and said wire coil has opposite ends and at least one telescoping intermediate mast tube includes means for lifting a portion of said wire coil between said opposite ends thereof for displacement with said at least one intermediate mast tube.

12. In a pneumatically actuated telescoping mast assembly having a mast axis and comprising a plurality of telescopically interengaged mast tubes having axially opposite ends and being axially slidable relative to one another along the mast axis between retracted and extended positions, means for displacing said mast tubes between said refracted and extended positions, and a wire coil for providing electrical power to a fixture on an end of said mast assembly, the improvement comprising:

a guide collar on one of said opposite ends of the radially inner one of said tubes slidably engaging the inner side of said radially outer tube; and, at least two axially adjacent ones of said telescoping mast tubes include a stop collar held on the other of said ends of each tube by a snap ring.

13. The telescoping mast assembly of claim 12, wherein the radially inner one of the at least two tubes has a double wrap snap ring thereon between the one and the other of the opposite ends thereof for engaging the stop collar on the radially outer one of the at least two tubes to limit relative axial displacement therebetween.

14. The telescoping mast assembly of claim 12, wherein said wire coil has opposite ends and at least one of said telescoping mast sections includes means for supporting said wire coil between said opposite ends thereof for displacement with the one mast section.

15. In a pneumatically actuated telescoping mast assembly having a mast axis and comprising a plurality of telescopically interengaged mast tubes having axially opposite ends and being axially slidable relative to one another along the mast axis between retracted and extended positions, means for displacing said mast tubes between said retracted and extended positions, and a wire coil for providing electrical power to a fixture on an end of said mast assembly, the improvement comprising:

said wire coil having opposite ends and at least one telescoping intermediate mast section including means for lifting said wire coil between said opposite ends thereof for displacement with said one intermediate mast section.

16. In a pneumatically actuated telescoping mast assembly having a mast axis and comprising a plurality of telescopically interengaged mast tubes having axially opposite ends and being axially slidable relative to one another along the mast axis between retracted and extended positions, means for displacing said mast tubes between said retracted and extended positions, and a wire coil for providing electrical power to a fixture on an end of said mast assembly, the improvement comprising:

said wire coil having opposite ends and at least one of said telescoping mast sections including means for supporting said wire coil between said opposite ends thereof for displacement with the one mast section at least two axially adjacent ones of said telescoping mast tubes include a stop collar held on one of said ends of each tube by a snap ring.

17. The telescoping mast assembly of claim 16, wherein the radially inner one of the at least two tubes has a double wrap snap ring thereon between the one and the other of the opposite ends thereof for engaging the stop collar on the radially outer one of the at least two tubes to limit relative axial displacement therebetween.

18. The telescoping mast assembly of claim 17, and a guide collar on the other of said opposite ends of the radially inner tube and slidably engaging the inner side of said radially outer tube.

19. In a pneumatically actuated telescoping mast assembly having a mast axis and comprising a plurality of telescopically interengaged mast tubes having axially opposite ends and being axially slidable relative to one another along the mast axis between refracted and extended positions, means for displacing said mast tubes between said refracted and extended positions, and a wire coil for providing electrical power to a fixture on an end of said mast assembly, the improvement comprising:

said wire coil having opposite ends within said telescoping mast sections and at least one of said telescoping mast sections including a support collar for lifting a portion of said wire coil between said opposite ends thereof for displacement with the one mast section.

* * * * *